(12) United States Patent
Asad et al.

(10) Patent No.: US 11,850,918 B1
(45) Date of Patent: Dec. 26, 2023

(54) SYSTEM FOR WATER COLLECTION AND REDISTRIBUTION IN VEHICLE

(71) Applicant: Prince Mohammad Bin Fahd University, Dhahran (SA)

(72) Inventors: Muhammad Asad, Dhahran (SA); Muhammad Azhar Ali Khan, Dhahran (SA); Mushtaq Khan, Dhahran (SA); Hisham Muhammad Imran, Dhahran (SA); Abdulrahman Alghamdi, Dhahran (SA); Yousef Almulla, Dhahran (SA); Sultan Abumustafa, Dhahran (SA); Zuhair Kanwal, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/481,727

(22) Filed: Oct. 5, 2023

(51) Int. Cl.
  *B60H 1/32* (2006.01)
  *B60S 1/50* (2006.01)
(52) U.S. Cl.
  CPC ............ *B60H 1/32331* (2019.05); *B60S 1/50* (2013.01); *Y10T 137/4757* (2015.04)
(58) Field of Classification Search
  CPC ........... B60H 1/32331; Y10T 137/5907; Y10T 137/4757; B60S 1/50
  See application file for complete search history.

(56) References Cited

U.S. PATENT DOCUMENTS

| | | | |
|---|---|---|---|
| 5,651,259 A | 7/1997 | Twyman | |
| 6,209,573 B1 * | 4/2001 | Chau | F16K 31/22 137/340 |
| 6,804,949 B2 | 10/2004 | Andrews et al. | |

FOREIGN PATENT DOCUMENTS

| | | |
|---|---|---|
| EP | 3 218 235 B1 | 5/2020 |
| TW | M412343 U1 | 9/2011 |
| WO | 2015/186143 A2 | 12/2015 |
| WO | WO-2015186143 A2 * | 12/2015 ............. B01D 5/003 |

OTHER PUBLICATIONS

Akram et al.; Recycling of Condensed Water from an Air Conditioning Unit; Conference: International Conference on Computer, Commnication, Chemical, Materials and Electronic Engineering At: University of Rajshahi,Rajshahi-6205, Bangladesh ; Feb. 2018 ; 8 Pages.

* cited by examiner

*Primary Examiner* — Lionel Nouketcha
(74) *Attorney, Agent, or Firm* — Oblon, McClelland, Maier & Neustadt, L.L.P.

(57) ABSTRACT

A system for water collection and redistribution in a vehicle is provided. The system includes a storage tank for receiving water condensate from an air conditioner (AC) of the vehicle and store the water condensate. A wiper tank is positioned above the storage tank for receiving the water condensate from the storage tank. Further, a cooling coil is positioned adjacent to a radiator of the vehicle. A slanted pipe having an upper end in fluid communication with the wiper tank and a lower end in fluid communication with the cooling coil. The wiper tank discharges excess water condensate by gravity to the cooling coil via the slanted pipe to cool the radiator, when the water condensate reaches a certain level in the wiper tank.

20 Claims, 6 Drawing Sheets

SYSTEM FOR WATER COLLECTION AND REDISTRIBUTION IN VEHICLE

BACKGROUND

Technical Field

The present disclosure is directed to a water management system in a vehicle, and particularly related to a system and a method for collecting water condensate from an air conditioner (AC) of the vehicle and redistributing the water condensate in the vehicle for auxiliary purposes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Generally, a motor vehicle includes various operating systems such as cooling systems and cleaning systems, which may require water for efficient operation. The water level must be regularly checked to ensure sufficient water is present for effective operation of these systems. Insufficient water supply requires topping off the water supply. In particular, the systems include various units such as a radiator, a wiper tank, and a battery each of which may contain water. Over a period of time, water is lost in the radiator due to leakage and evaporation. The water level in the wiper tank is reduced due to consumption of water for regular cleaning of the windshield. Further, water is also lost from the battery through evaporation and boiling caused by heating of the battery and engine temperature. Therefore, to maintain the required amount of water in these systems, a vehicle owner needs to routinely inspect and refill corresponding water storage which may be inconvenient and time consuming for the vehicle owner. If the refilling is not done as required, then it may lead to damage of other components, which in turn may lead to lack of safety to drivers, passengers and the vehicle. Further, the water level in the cells of the battery should be carefully adjusted to optimize the performance and lifespan of the battery. Especially in gulf countries that experience strained water resources, high costs for water desalination are encountered to meet the water needs of vehicle systems.

U.S. Pat. No. 6,209,573B1 discloses a system for collecting water condensate from an air conditioner (AC) and redistributing the water condensate to several water reservoirs using a pump. Some amount of the water condensate is used for a radiator cooling system and the remaining water condensate is mixed with a cleaning agent in another water reservoir for windshield cleaning. However, multiple reservoirs add complexity to the system and lead to high maintenance and manufacturing cost.

U.S. Pat. No. 5,651,259A discloses a system that collects water condensate from an AC and redistributes the water condensate to a wiper tank using a pump. However, the system is limited to only cleaning applications.

WO2015186143A2 discloses a system that collects water condensate from an AC and redistributes the water condensate to various reservoirs, such as an engine coolant reservoir and a windshield water reservoir. However, the engine coolant reservoir and the windshield water reservoir are two separate and parallel destinations.

Each of the aforementioned references suffers from one or more drawbacks hindering their adoption. Accordingly, it is one object of the present disclosure to provide systems and methods for water collection and redistribution in vehicles to improve operational efficiency of windshield cleaning systems, engine cooling systems, and air conditioning systems.

SUMMARY

In an exemplary embodiment, a system for water collection and redistribution in a vehicle is disclosed. The system includes a storage tank configured to receive water condensate from an air conditioner (AC) of the vehicle and store the water condensate. The system further includes a wiper tank positioned above the storage tank and configured to receive the water condensate from the storage tank. The system further includes a cooling coil positioned adjacent to a radiator of the vehicle, and a slanted pipe having an upper end in fluid communication with the wiper tank and a lower end in fluid communication with the cooling coil. The wiper tank is configured to discharge excess water by gravity to the cooling coil via the slanted pipe to cool the radiator, when the water condensate reaches a certain level in the wiper tank.

In some embodiments, the system further includes a discharge line that connects an upper area of the wiper tank to the upper end of the slanted pipe.

In some embodiments, the excess water is automatically discharged by gravity from the wiper tank to the slanted pipe via the discharge line when the water condensate reaches the upper area of the wiper tank.

In some embodiments, there is no pump for moving the water between the wiper tank and the cooling coil.

In some embodiments, there is no sensor for determining when the excess water is discharged from the wiper tank.

In some embodiments, the cooling coil is positioned below the lower end of the slanted pipe and below the upper area of the wiper tank.

In some embodiments, the discharge line is connected to a top surface of the wiper tank so that the wiper tank is configured to discharge the excess water to the slanted pipe, when the wiper tank is full.

In some embodiments, the system further includes a three-way valve coupled with the slanted pipe.

In some embodiments, the three-way valve is configured to regulate water flow from the slanted pipe to enter either the cooling coil or a flooded battery of the vehicle.

In some embodiments, the system further includes a sensor that is configured to close the three-way valve toward the cooling coil and open the three-way valve toward the flooded battery when a water level in the flooded battery is below a threshold. The sensor is further configured to close the three-way valve toward the flooded battery and open the three-way valve toward the cooling coil when the water level in the flooded battery reaches or is above the threshold.

In some embodiments, the three-way valve is positioned above the flooded battery.

In some embodiments, the system further includes a pump that includes a pump suction line and is configured to transfer the water condensate from the storage tank to the wiper tank via the pump suction line.

In some embodiments, the system further includes a pipe or nozzle configured to transfer the water condensate from a drain of the air conditioner to the storage tank.

In some embodiments, the wiper tank is configured to discharge the excess water to a condenser of the air conditioner when the wiper tank is full.

In some embodiments, the slanted pipe has an angle of 10-50° relative to a ground.

In another exemplary embodiment, a method of water collection and redistribution in a vehicle is disclosed. The method includes collecting water condensate from an air conditioner of the vehicle in a storage tank and transferring the water condensate from the storage tank to a wiper tank of the vehicle positioned above the storage tank. When the water condensate reaches a certain level in the wiper tank, the method includes discharging the excess water by gravity from the wiper tank to a cooling coil of a radiator of the vehicle via a slanted pipe that has an upper end in fluid communication with the wiper tank and a lower end in fluid communication with the cooling coil.

In some embodiments, the excess water is automatically discharged from the wiper tank by gravity with no sensor, when the water condensate reaches the certain level in the wiper tank.

In some embodiments, the excess water is automatically discharged from the wiper tank by gravity with no pump, when the water condensate reaches the certain level in the wiper tank.

In some embodiments, the method includes closing a three-way valve toward the cooling coil and opening the three-way valve toward a flooded battery when a water level in the flooded battery of the vehicle is below a threshold. The three-way valve is coupled with the slanted slope. The method further includes closing the three-way valve toward the flooded battery and opening the three-way valve toward the cooling coil when the water level in the flooded battery reaches or is above the threshold.

In some embodiments, the method further includes transferring the water condensate from the storage tank to the wiper tank via a pump.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
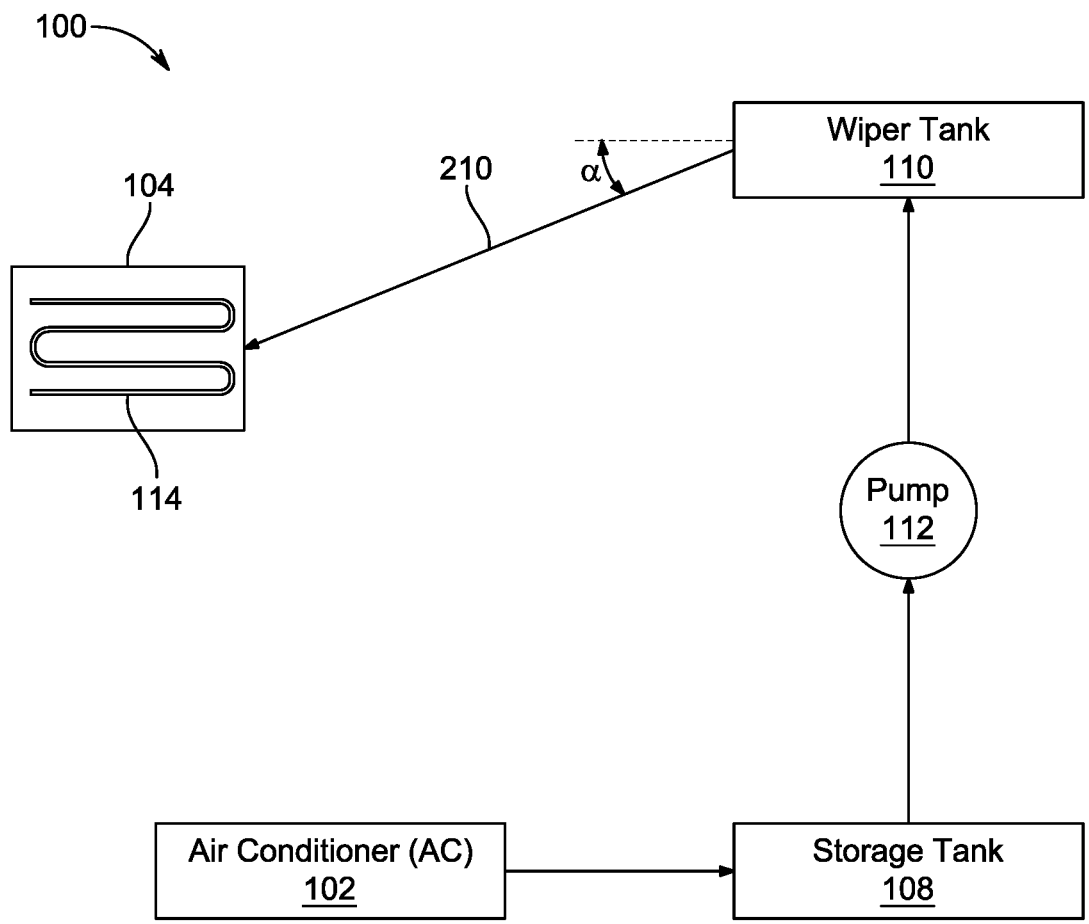
FIG. 1 is a schematic block diagram of a system for water collection and redistribution in a vehicle, according to an embodiment.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system for collecting water condensate from an air conditioner (AC) of a vehicle and redistributing the water condensate to a wiper tank and, depending on a level of water in the wiper tank, optionally to a water-flooded battery or a cooling coil preferably based on a level of water in the flooded battery. The system includes a storage tank having a pipe, which is connected to a drain of the AC of the vehicle to receive the water condensate therethrough and store the water condensate in the storage tank. A pump is optionally used to supply the water condensate from the storage tank to the wiper tank through a pump suction line. After filling the wiper tank, the excess water is discharged through a discharge line and a slanted pipe towards the cooling coil of a radiator. The cooling coil is positioned below the wiper tank and the slanted pipe is disposed at an angle to fluidly communicate between the wiper tank and the cooling coil. As such, when the wiper tank is filled, the excess water discharges through the slanted pipe by gravity.

Referring to FIG. 1, a schematic block diagram of a system 100 for water collection and redistribution in a vehicle is illustrated, according to an embodiment of the present disclosure. The vehicle may be, but is not limited to, a passenger vehicle, a commercial vehicle, or any vehicle that requires an air-conditioned cabin. The vehicle includes a heating, ventilating, and air conditioning (HVAC) system, otherwise generally referred to as the air conditioner (AC) 102, for conditioning air in a closed cabin of the vehicle. The closed cabin may be a passenger cabin in the case of the passenger vehicle and may be a storage cabin in the case of the commercial vehicle. The AC 102 may be used for heating or cooling the air in the closed cabin based on the air conditioning requirements and the ambient temperature. During an operation of the AC 102, condensation happens due to hot and humid weather. Condensation is generally defined as a process in which water vapor turns into a liquid when warm and humid air contacts with a cold surface. In the AC 102, air ducts and air vents may become cold surfaces during a cyclic operation thereof and condensation happens on the cold surfaces. The moisture, otherwise referred to as the water condensate, coming out from the AC 102 may drip through a drain thereof. In one embodiment, the drain may be in the form of a conduit to drain and direct the water condensate from the AC 102. In some embodiments, the drain may be made of a hard material such as a metal or metal alloy. In some embodiments, the drain may be a hose made of a flexible material such as an elastomer. The vehicle further includes auxiliary systems like a windshield cleaning system, a cooling system for an engine such as a radiator 104, and an electrical system having a battery. The auxiliary systems may require periodic maintenance for efficient operation thereof. Failure to perform periodic maintenance of the auxiliary systems may degrade operating performance of the vehicle and safety of the driver and passengers of the vehicle.

The system 100 of the present disclosure includes a storage tank 108 configured to receive the water condensate from the AC 102 of the vehicle. The storage tank 108 may be made of a metal, a metal alloy such as steel, or polymers. A volume of the storage tank 108 may be defined based on various operating parameters of the vehicle such as, but are not limited to, operating capacity of the AC 102, and type of the vehicle. The storage tank 108 may be in fluid communication with the drain of the AC 102 to receive the water condensate. The storage tank 108 is further configured to store the water condensate for auxiliary purposes described herein below.

The system 100 further includes a wiper tank 110, which is a part of the windshield cleaning system of the vehicle, configured to receive the water condensate from the storage tank 108. The wiper tank 110 is generally configured to supply cleaning water to clean a windshield of the vehicle using wipers. Generally, a windshield cleaning solution is stored in the wiper tank 110 manually for cleaning the windshield. Over a period of time, the windshield cleaning solution may be consumed to below a required quantity in the wiper tank 110 which may demand top-up of the wiper tank 110 for efficient cleaning of the windshield. As such, the water condensate from the storage tank 108 is supplied to the wiper tank 110 when the required quantity of the windshield cleaning solution is not met. The system 100 further includes a pump 112 configured to be in fluid communication with the storage tank 108 and the wiper tank 110. The pump 112 is configured to supply the water condensate from the storage tank 108 to the wiper tank 110 when a level of water in the wiper tank 110 comes down. In an embodiment, the pump 112 may be a diaphragm pump.

The system 100 further includes a cooling coil 114 of the radiator 104 of the vehicle configured to be in communication with the wiper tank 110. Particularly, an external surface or an interior of the cooling coil 114 is configured to receive the water condensate from the wiper tank 110 by gravity. Generally, the radiator 104 is fluidly coupled with the engine to extract heat therefrom. The radiator 104 includes the cooling coil 114 and fins to improve heat transfer rate of the radiator 104. The cooling coil 114 is configured to carry a cooling liquid such as water to absorb heat from the engine. A desired amount of water should be maintained in the cooling coil 114 for efficiently removing the heat from the engine. Failure to maintain the desired amount of the water in the cooling coil 114 may lead to overheating of the engine and thereby the vehicle may cease to operate. As such, excess water condensate from the wiper tank 110 is supplied to the cooling coil 114 to maintain the desired amount of water in the cooling coil 114.

Figure 2:
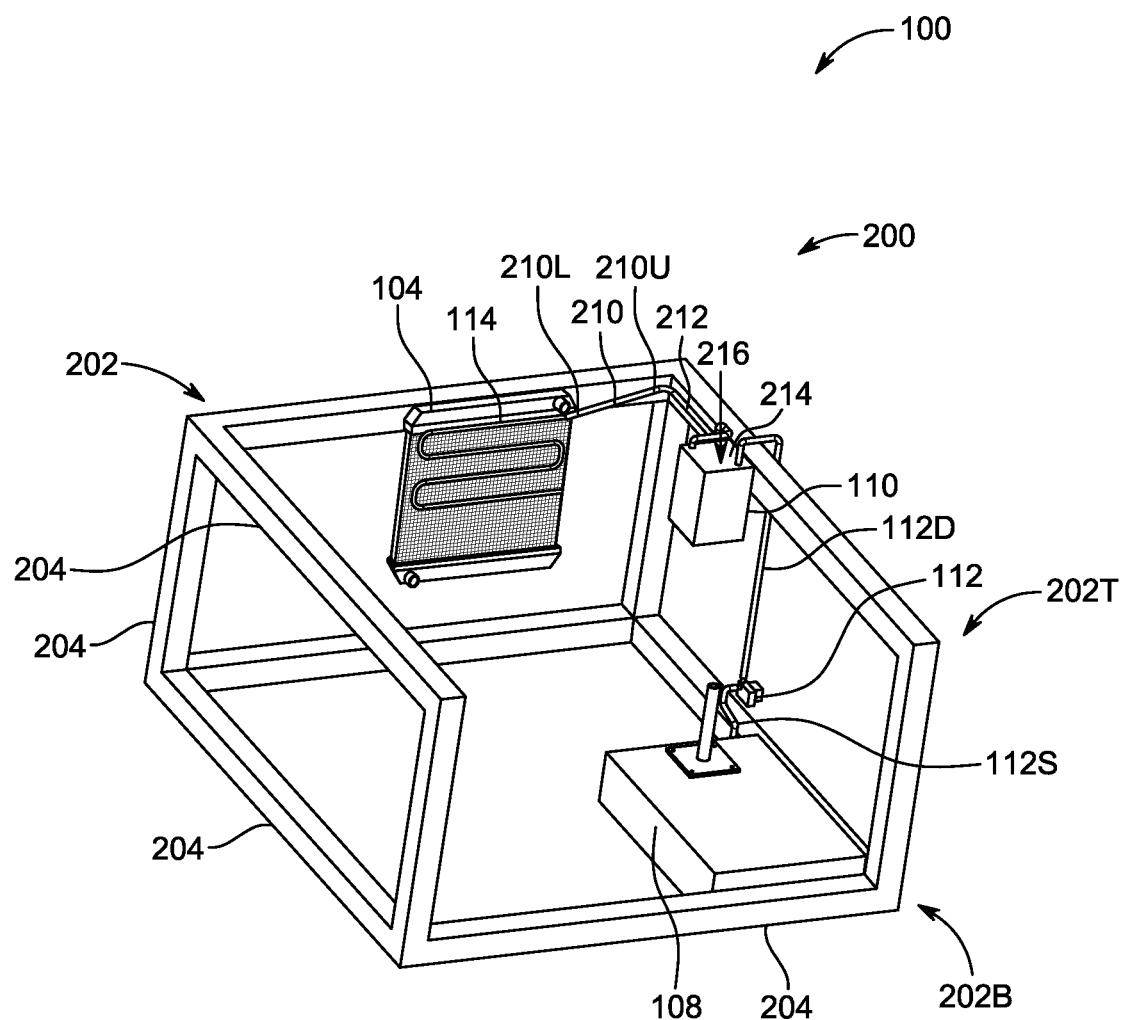
FIG. 2 is a schematic perspective view of a working model of the system of FIG. 1, according to certain embodiments.
Figure 3:
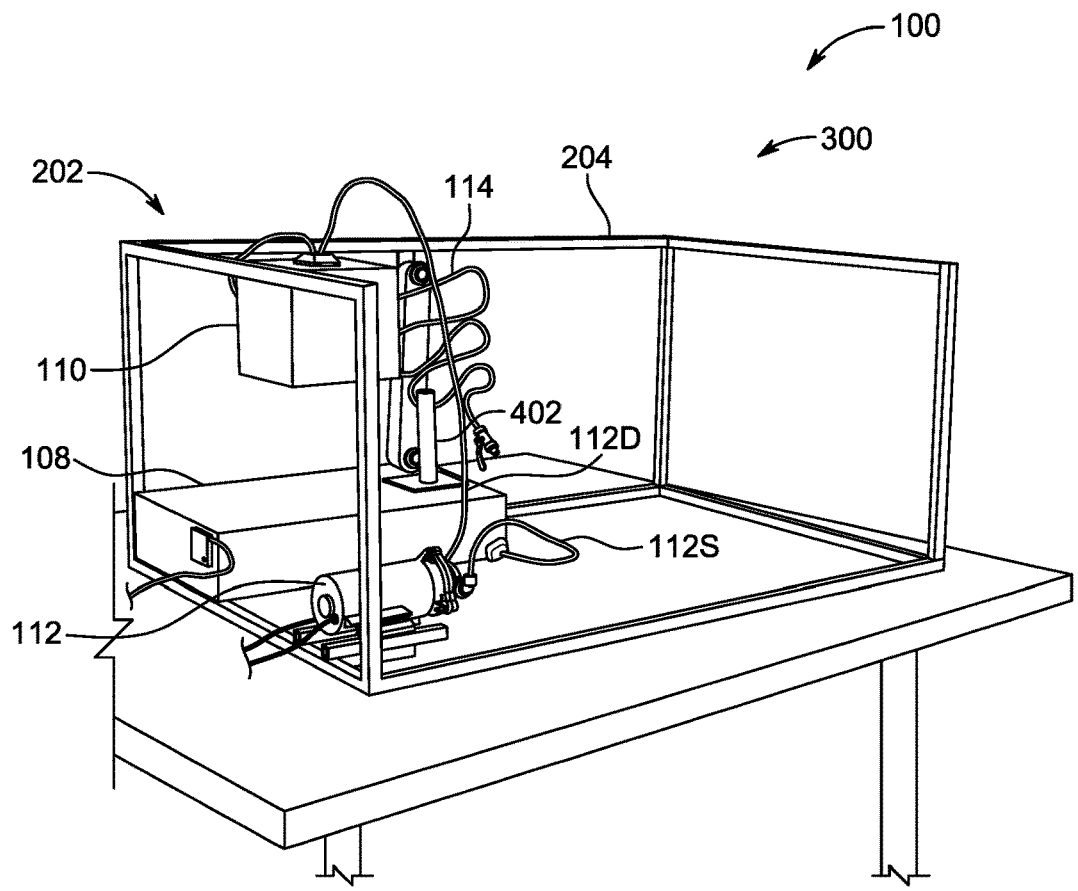
FIG. 3 is a schematic perspective view of a working prototype of the system of FIG. 1, according to certain embodiments.

Referring to FIG. 2 and FIG. 3, a schematic perspective view of a working model 200 and a working prototype 300, respectively, of the system 100 is illustrated, according to an embodiment of the present disclosure. The working model 200 includes a frame 202 made of a metal or a metal alloy in the form of a cubic or cuboid shape. The frame 202 includes a plurality of bars 204 connected each other to support various elements such as the storage tank 108, the wiper tank 110, the pump 112 and the cooling coil 114 of the system 100. The plurality of bars 204 includes multiple horizontal bars and multiple vertical bars. In one embodiment, the plurality of bars 204 may be detachably coupled by fastening members such as bolts and nuts. In another embodiment, the plurality of bars 204 may be fixedly attached using a welding method. The frame 202 includes a bottom portion 202B helps to support on a ground and detachably support the storage tank 108 and a top portion 202T configured to detachably support the wiper tank 110 and the cooling coil 114 of the radiator 104. Note that the frame 202 is shown here to illustrate relative positions and functions of various elements and may not be necessary when the working model 200 is implemented in a vehicle. That is, various elements such as the storage tank 108, the wiper tank 110, the pump 112, the cooling coil 114, etc. of the system 100 can be supported by or attached to elements of the vehicle and arranged similarly to FIG. 2, without the frame 202.

Figure 4:
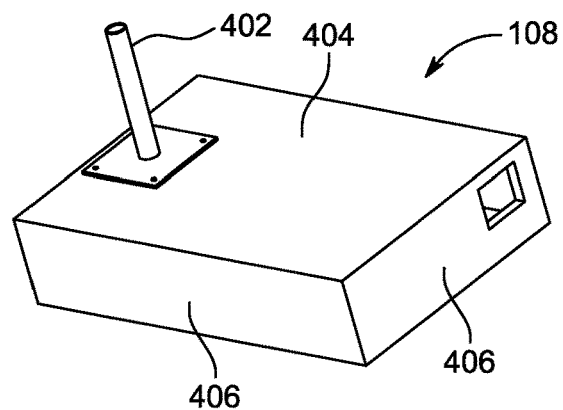
FIG. 4 is a perspective view of a storage tank of the system, according to certain embodiments.

Referring to FIG. 1, FIG. 2, and FIG. 3, the storage tank 108 is attached to the bottom portion 202B of the frame 202. In some embodiments, the storage tank 108 may be detachably attached to the bars 204 of the frame 202 using fastening members. In some embodiments, the storage tank 108 may be fixedly attached to the bars 204 using a welding method. The wiper tank 110 is positioned above the storage tank 108 and attached to the bar 204 at the top portion 202T of the frame 202. In one embodiment, the wiper tank 110 may be detachably attached to the bars 204 of the frame 202 using fastening members. In another embodiment, the wiper tank 110 may be fixedly attached to the bars 204 using a welding method. As shown in FIG. 4, the storage tank 108 is in the form of a cuboid shape. The system 100 includes a pipe 402, otherwise referred to as a nozzle 402, attached to an upper panel 404 of the storage tank 108. Side panels 406 of the storage tank 108 is configured to attach with the bars 204 of the frame 202. The pipe 402 is configured to fluidly communicate with the drain of the AC 102 such that the water condensate is transferred from the drain of the AC 102 to the storage tank 108.

The pump 112 includes a pump suction line 112S configured to fluidly communicate the pump 112 with the storage tank 108. The pump suction line 112S may be made of hard materials such as metals or metal alloys or made of flexible materials such as polymers or elastomers. One end of the pump suction line 112S is coupled with the storage tank 108 and another end is coupled with a suction port of the pump 112. The pump 112 further includes a pump discharge line 112D configured to fluidly communicate the pump 112 with the wiper tank 110. The pump suction line 112S and the pump discharge line 112D are together configured to supply the water condensate from the storage tank 108 to the wiper tank 110. The pump discharge line 112D and the pump suction line 112S may be supported on the bars 204 of the frame 202 using fastening devices such as clips and clamps. As shown in FIG. 3, the pump 112 is supported on the bars 204 of the frame 202.

The system 100 further includes a slanted pipe 210 configured to fluidly communicate the cooling coil 114 with the wiper tank 110. The slanted pipe 210 includes an upper end 210U configured to fluidly communicate with the wiper tank 110 and a lower end 210L configured to fluidly communicate with the cooling coil 114. Particularly, the upper end 210U of the slanted pipe 210 is coupled to a discharge line 212 of the system 100. As such, the cooling coil 114 is positioned below the wiper tank 110 to receive the water condensate from the wiper tank 110 through the slanted pipe 210 by gravity. The slanted pipe 210 and the discharge line 212 together are configured to fluidly communicate the wiper tank 110 with the cooling coil 114 of the radiator 104. In one embodiment, the discharge line 212 may be made of hard materials such as metals or metal alloys and attached to the bars 204 using fastening devices. One end of the discharge line 212 is connected to an upper area 214 of the wiper tank 110 and another end is coupled to the upper end 210U of the slanted pipe 210 which in turn connected to the cooling coil 114 of the radiator 104 with the lower end 210L thereof. The slanted pipe 210 is attached to the discharge line 212 and the cooling coil 114 in such a way that the slanted pipe 210 has an angle 'α' of 10°-50° relative to the ground. More preferably, the slanted pipe 210 may be positioned at an angle 'α' of 20°-40°, preferably 25°-35°, preferably about 25°, relative to the ground. In some embodiments, the discharge line 212 is connected at a top surface 216 of the wiper tank 110 so that the wiper tank 110 is configured to discharge the excess water to the slanted pipe 210 when the wiper tank 110 is full. In an implementation of the present disclosure, existing plastic wiper tank installed in the vehicle may be used to fluidly communicate with the storage tank 108 via the pump 112. The existing plastic wiper tank may be provided with an opening to fluidly couple with the discharge line 212. The discharge line 212 may be made of materials such as copper or aluminum. In an example, the discharge line 212 may have a diameter of 5 mm. The discharge line 212 and the slanted pipe 210 may be coupled to the bars 204 at the angle 'α' of 25° relative to a horizontal plane such that the excess water condensate from the wiper tank 110 flows to the cooling coil 114 of the radiator 104 using the gravitational force.

The cooling coil 114 is attached to the bars 204 of the frame 202 and positioned below the lower end 210L of the slanted pipe 210 and below the upper area 214 of the wiper tank 110. With the inclined orientation of the slanted pipe 210 and the position of the cooling coil 114 below the lower end 210L of the slanted pipe 210, when the water condensate reaches a certain level in the wiper tank 110, the excess water condensate is discharged by gravity to the cooling coil 114 via the slanted pipe 210 to cool the radiator 104. Further, the excess water condensate is automatically discharged by gravity from the wiper tank 110 to the slanted pipe 210 via the discharge line 212 when the water condensate reaches the upper area 214 of the wiper tank 110. The certain level in the wiper tank 110 may be defined as a level at which the discharge line 212 is connected to the upper area 214 of the wiper tank 110. Such that when the water condensate is supplied to the wiper tank 110 beyond the level at which the discharge line 212 is connected to the wiper tank 110, then such excess water condensate is discharged through the discharge line 212 and the slanted pipe 210 to the cooling coil 114. As such, no sensor is required for determining when the excess water condensate is discharged from the wiper tank 110. Further, as the excess water condensate is discharged from the wiper tank 110 to the cooling coil 114 by gravity, no pump is required to move the water condensate between the wiper tank 110 and the cooling coil 114. In some embodiments, the wiper tank 110 is configured to discharge the excess water condensate to a condenser of the AC 102 when the wiper tank 110 is full. In such a case, the system 100 may include a condenser conduit fluidly coupled to the condenser of the AC 102 and the discharge line 212. Each of the slanted pipe 210 and the condenser conduit may be provided with a flow control valve such that the flow of excess water condensate from the wiper tank 110 can be controlled manually. Note that the discharge line 212 does not have to be connected to the top surface 216 of the wiper tank 110 but may instead be connected to the upper area 214 below the top surface 216. As a result, the wiper tank 110 can be configured to discharge the excess water condensate to the condenser of the AC 102 before the wiper tank 110 is full.

Figure 5:
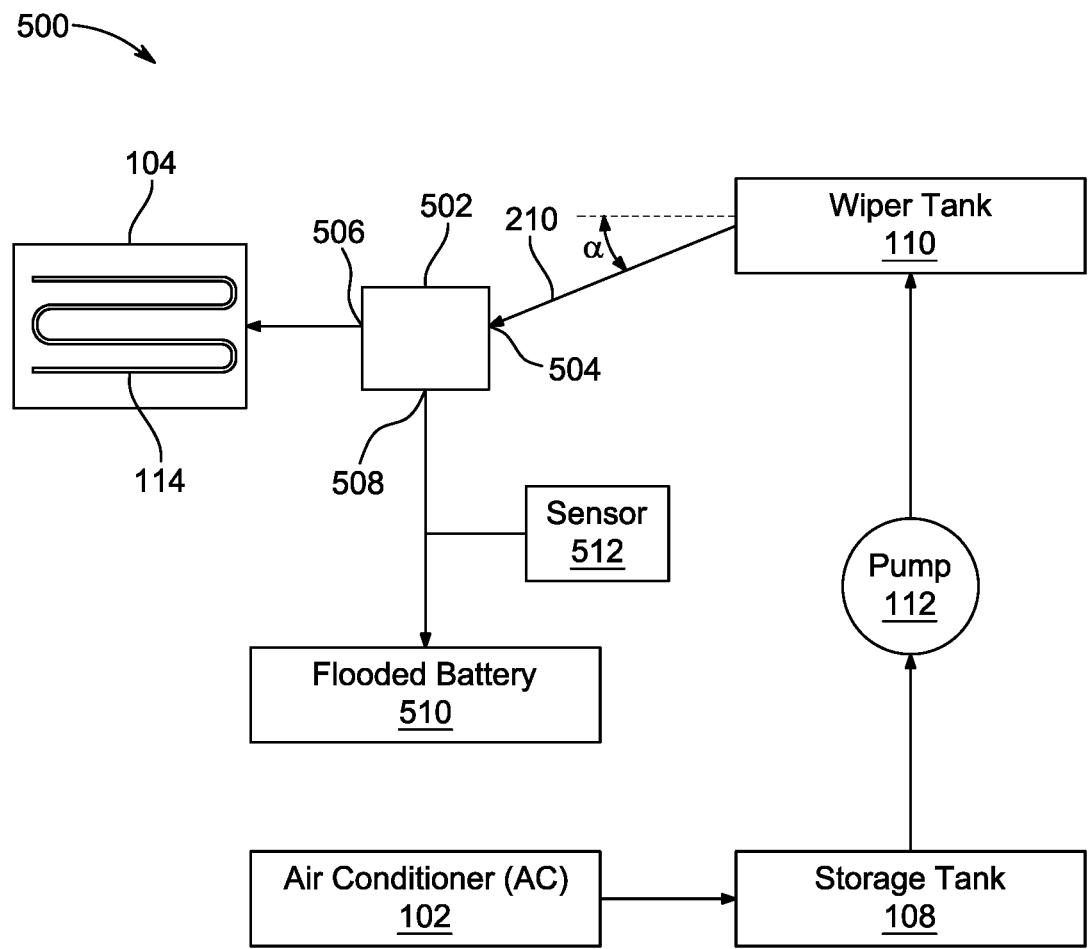
FIG. 5 is a schematic block diagram of a system for water collection and redistribution in a vehicle, according to another embodiment.

Referring to FIG. 5, a schematic block diagram of a system 500 for water collection and redistribution in the vehicle is illustrated, according to another embodiment of the present disclosure. The system 500 includes the storage tank 108 configured to receive the water condensate from the AC 102 and store the water condensate for auxiliary purposes. The storage tank 108 is in fluid communication with the drain of the AC 102. The system 500 further includes the wiper tank 110 configured to receive the water condensate from the storage tank 108, and the pump 112 configured to be in fluid communication with the storage tank 108 and the wiper tank 110 to supply the water condensate from the storage tank 108 to the wiper tank 110. The system 500 further includes the cooling coil 114 configured to be in fluid communication with the wiper tank 110 to receive the excess water condensate from the wiper tank 110 by gravity. The system 500 further includes the slanted pipe 210 configured to fluidly communicate with the wiper tank 110.

The system 500 further includes a three-way valve 502 coupled with the slanted pipe 210, particularly in this example coupled with the lower end 210L of the slanted pipe 210. The three-way valve 502 includes an inlet port 504 configured to fluidly communicate with the wiper tank 110 via the slanted pipe 210, a first outlet port 506 configured to fluidly communicate with the cooling coil 114, and a second outlet port 508 configured to fluidly communicate with the battery, otherwise referred to as a flooded battery 510, of the vehicle. As such, the three-way valve 502 is configured to regulate flow of the water condensate from the slanted pipe 210 to the cooling coil 114 or the flooded battery 510 of the vehicle. In an embodiment, the three-way valve 502 may be actuated electrically. In some embodiments, the three-way valve 502 may be actuated hydraulically or pneumatically.

The system 500 further includes a sensor 512 configured to actuate the three-way valve 502 based on a level of water in the flooded battery 510. The sensor 512 may be disposed in the flooded battery 510 to generate an input signal indicative of the level of water in the flooded battery 510. In some embodiments, the sensor 512 may be further communicated with a controller to determine the level of the water in the flooded battery 510 based on the input signal. The controller may be preset with a threshold indicative of a target level of water in the flooded battery 510. The threshold may be preset in the controller manually. In an embodiment, the threshold may be defined based on various design parameters such as, but are not limited to, an operating capacity of the flooded battery 510. The controller may be further electrically coupled to the three-way valve 502 to control actuation thereof based on the level of water in the flooded battery 510.

Figure 6:
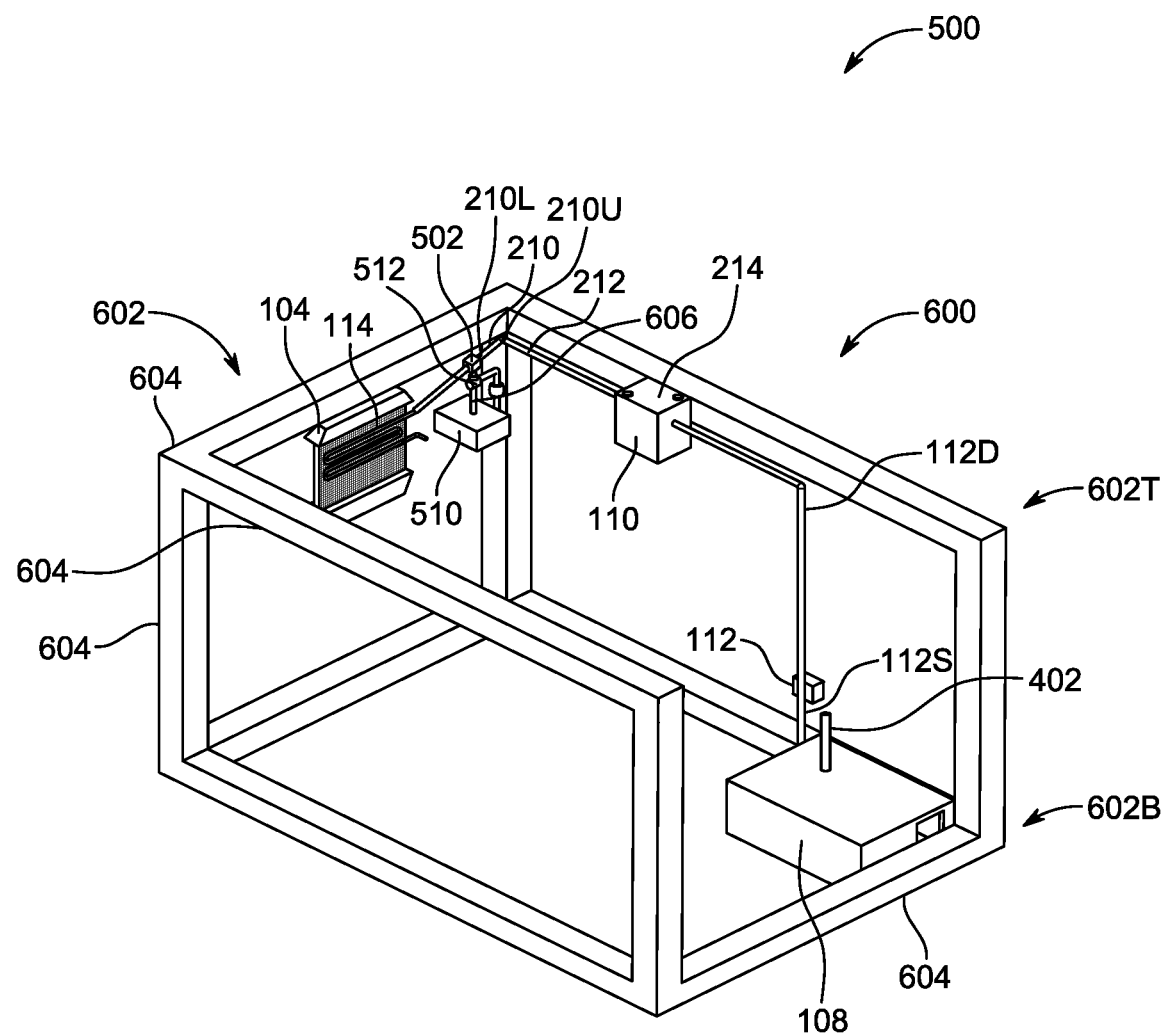
FIG. 6 is a schematic perspective view of a working model of the system of FIG. 5, according to certain embodiments.

Referring to FIG. 6, a schematic perspective view of a working model 600 of the system 500 is illustrated, according to an embodiment of the present disclosure. The working model 600 includes a frame 602 having a plurality of bars 604 connected to each other using fastening members or a welding method. The storage tank 108 is attached to a bottom portion 602B of the frame 602 and the wiper tank 110 is positioned above the storage tank 108 and attached to the bars 604 at a top portion 602T of the frame 602. The pipe 402, or the nozzle 402, is attached to the upper panel 404 of the storage tank 108 to fluidly communicate with the drain of the AC 102 such that the water condensate is transferred from the AC 102 to the storage tank 108. The pump suction line 112S is attached to the bars 604 and fluidly couple the pump 112 with the storage tank 108 and the pump discharge line 112D is attached to the bars 604 and fluidly couple the pump 112 with the wiper tank 110. The pump suction line 112S and the pump discharge line 112D are together configured to transfer the water condensate from the storage tank 108 to the wiper tank 110. The slanted pipe 210 and the discharge line 212 are attached to the bars 604 and fluidly communicate the wiper tank 110 with the cooling coil 114 of the radiator 104. The slanted pipe 210 is attached to the discharge line 212 at an angle 'α' of 10-50° relative to the ground. The cooling coil 114 is positioned below the wiper tank 110 and attached to the bars 604 of the frame 602. Similar to the frame 202, the frame 602 is shown here for illustrative purposes and may not be necessary when the system 500 is implemented in a vehicle.

Referring to FIG. 5 and FIG. 6, the lower end 210L of the slanted pipe 210 is attached to the inlet port 504 of the three-way valve 502. With the inclined orientation of the slanted pipe 210, when the water condensate reaches the certain level in the wiper tank 110, the wiper tank 110 discharges the excess water condensate by gravity to the three-way valve 502. The flooded battery 510 of the system 500 may be attached to the bars 604 using fastening members. The flooded battery 510 is further fluidly coupled with the second outlet port 508 of the three-way valve 502 via a battery conduit 606. Particularly, the three-way valve 502 is positioned above the flooded battery 510. In one embodiment, the sensor 512 may be coupled to the battery conduit 606 to detect the level of water in the flooded battery 510. In another embodiment, the sensor 512 may be disposed within the flooded battery 510. The three-way valve 502 may also be supported on the bars 604 of the frame 602. Further, the controller in electric communication with the sensor 512 and the three-way valve 502 may also be supported on the frame 602. During the operation of the AC 102, the sensor 512 is configured to actuate the three-way valve 502 to control the flow of the excess water condensate coming from the wiper tank 110. With the inclined orientation of the slanted pipe 210, when the water condensate reaches the certain level in the wiper tank 110, the wiper tank 110 discharges the excess water condensate by gravity to the three-way valve 502. The excess water condensate is automatically discharged by gravity from the wiper tank 110 to the slanted pipe 210 via the discharge line 212 when the water condensate reaches the upper area 214 of the wiper tank 110. At the three-way valve 502, the water condensate may be either directed to the flooded battery 510 or the cooling coil 114. Particularly, the sensor 512 is configured to close the three-way valve 502 toward the cooling coil 114 and open the three-way valve 502 toward the flooded battery 510 when the water level in the flooded battery 510 is below the threshold. In particular, the sensor 512 generates the input signal indicative of the water level in the flooded battery 510 and communicates with the controller. The controller determines the water level based on the input signal and compares with the threshold preset in the controller. When the water level in the flooded battery 510 is below the threshold, the controller communicates with the three-way valve 502 to open the second outlet port 508 communicating with the flooded battery 510 to allow flow of the excess water condensate to the flooded battery 510 while the first outlet port 506 to the cooling coil 114 is closed. Similarly, the sensor 512 is configured to close the three-way valve 502 toward the flooded battery 510 and open the three-way valve 502 toward the cooling coil 114 when the water level in the flooded battery 510 reaches or is above the threshold. In such a case, the controller may communicate with the three-way valve 502 to open the first outlet port 506 to direct the excess water condensate to the cooling coil 114 while the second outlet port 508 to the flooded battery 510 is closed.

The wiper tank 110 is positioned above the cooling coil 114 of the radiator 104 and the flooded battery 510. Therefore, according to the present disclosure, the excess water condensate from the wiper tank 110 is overflowed towards the flooded battery 510 through the slanted pipe 210 and the three-way valve 502, and then flow towards the cooling coil 114 and the flooded battery 510 through the three-way valve 502 by gravity. Hence, there is a no need of additional pump/motor to supply the excess water condensate from the wiper tank 110 to the flooded battery 510 and the cooling coil 114.

Figure 7:
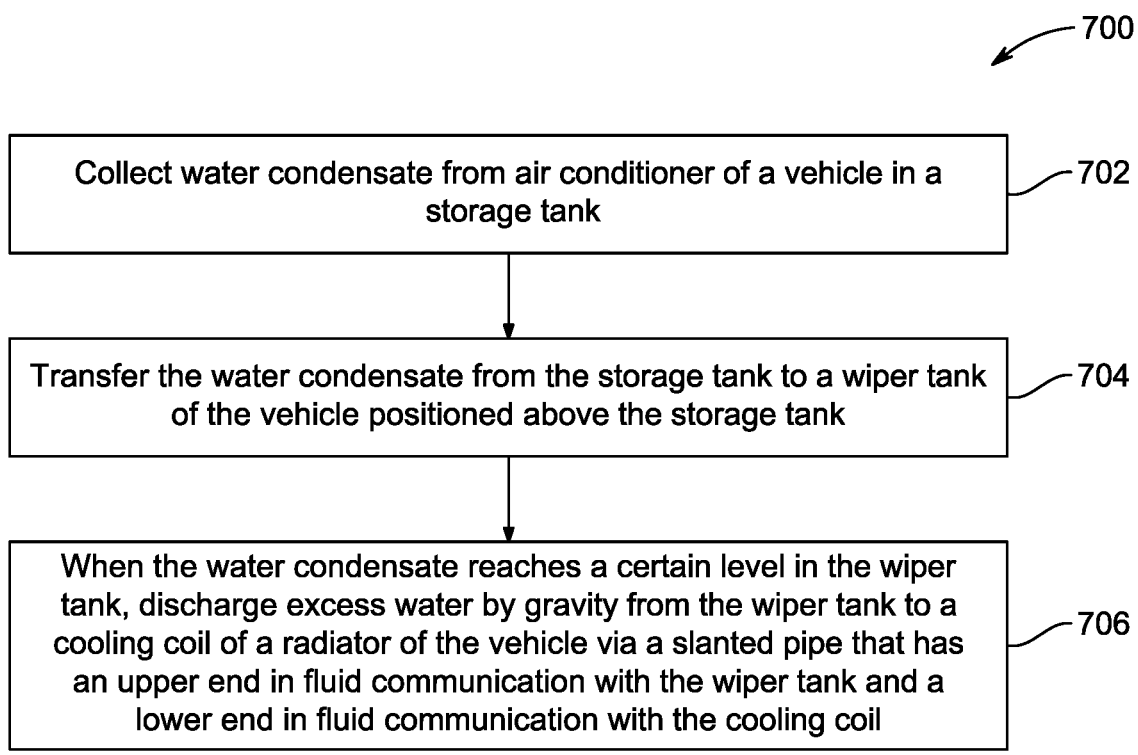
FIG. 7 is a schematic flow chart of a method of water collection and redistribution in the vehicle, according to certain embodiments.

Referring to FIG. 7, a schematic flow chart of a method 700 of water collection and redistribution in the vehicle is illustrated, according to an embodiment of the present disclosure. The order in which the method 700 described is not intended to be construed as a limitation, and any number of the described method steps can be combined in any order to implement the method 700. Additionally, individual steps may be removed or skipped from the method 700 without departing from the spirit and scope of the present disclosure. The method 700 of the present disclosure is illustrated with reference to the system 100 described in FIG. 1 and FIG. 2.

At step 702, the method 700 includes collecting the water condensate from the AC 102 of the vehicle in the storage tank 108. The pipe 402 of the storage tank 108 is fluidly coupled with the drain of the AC 102 such that the water condensate coming from the AC 102 during the operation thereof is collected in the storage tank 108.

At step 704, the method 700 includes transferring the water condensate from the storage tank 108 to the wiper tank 110 of the vehicle positioned above the storage tank 108. In some embodiments, the method 700 includes transferring the water condensate from the storage tank 108 to the wiper tank 110 via the pump 112. The pump suction line 112S is fluidly coupled with the pump 112 and the storage tank 108 and the pump discharge line 112D is fluidly coupled with the pump 112 and the wiper tank 110. Upon activation of the pump 112, the pump suction line 112S and the pump discharge line 112D together supply the water condensate from the storage tank 108 to the wiper tank 110. In some embodiments, the pump 112 may be communicated with the controller which in turn may be communicated with the storage tank 108, the wiper tank 110, the cooling coil 114 and the sensor 512. As a result, based on a level of water in the storage tank 108, the wiper tank 110, the cooling coil 114, and the flooded battery 510, the controller may actuate the pump 112 to supply the water condensate from the storage tank 108 to the wiper tank 110.

At step 706, the method 700 includes discharging the excess water by gravity from the wiper tank 110 to the cooling coil 114 of the radiator 104 of the vehicle, when the water condensate reaches the certain level in the wiper tank 110, via the slanted pipe 210 that has the upper end 210U in fluid communication with the wiper tank 110 and the lower end 210L in fluid communication with the cooling coil 114. Particularly, the upper end 210U of the slanted pipe 210 is coupled to the discharge line 212 which in turn fluidly coupled with the wiper tank 110. The slanted pipe 210 and the discharge line 212 together fluidly communicate the wiper tank 110 with the cooling coil 114. One end of the discharge line 212 is connected to the upper area 214 of the wiper tank 110 and another end is fluidly coupled to the upper end 210U of the slanted pipe 210. Further, the cooling coil 114 is positioned below the wiper tank 110. The slanted pipe 210 is attached to the discharge line 212 and the cooling coil 114 at the angle 'α' of 25° relative to the ground such that the excess water is discharged from the wiper tank 110 through the slanted pipe 210 by gravity. In some embodiments, the discharge line 212 is connected at the top surface 216 of the wiper tank 110 so that the wiper tank 110 discharges the excess water to the slanted pipe 210 when the wiper tank 110 is full. With the inclined orientation of the slanted pipe 210 and the position of the cooling coil 114 below the lower end 210L of the slanted pipe 210, when the water reaches the certain level in the wiper tank 110, the excess water is discharged by gravity to the cooling coil 114 via the slanted pipe 210 to cool the radiator 104.

In some embodiments, the excess water is automatically discharged from the wiper tank 110 by gravity with no sensor, when the water reaches the certain level in the wiper tank 110. In some embodiments, the excess water is automatically discharged from the wiper tank 110 by gravity with no pump, when the water reaches the certain level in the wiper tank 110.

In some embodiments, the three-way valve 502 is coupled with the lower end 210L of the slanted pipe 210. The inlet port 504 is fluidly communicated with the wiper tank 110 via the slanted pipe 210, the first outlet port 506 is fluidly communicated with the cooling coil 114, and the second outlet port 508 is fluidly communicated with the flooded battery 510. The sensor 512 is disposed in the flooded battery 510 to generate the input signals indicative of the level of water in the flooded battery 510. With the inclined orientation of the slanted pipe 210, when the water condensate reaches the certain level in the wiper tank 110, the wiper tank 110 discharges the excess water by gravity to the three-way valve 502. Particularly, the excess water is automatically discharged by gravity from the wiper tank 110 to the slanted pipe 210 via the discharge line 212 when the water condensate reaches the upper area 214 of the wiper tank 110.

In an embodiment, the method 700 includes closing the three-way valve 502 towards the cooling coil 114 and opening the three-way valve 502 towards the flooded battery 510 when the water level in the flooded battery 510 of the vehicle is below the threshold. Similarly, the method 700 includes closing the three-way valve 502 towards the flooded battery 510 and opening the three-way valve 502 towards the cooling coil 114 when the water level in the flooded battery 510 reaches or is above the threshold. Particularly, the sensor 512 helps to close the three-way valve 502 towards the cooling coil 114 and open the three-way valve 502 towards the flooded battery 510 when the water level in the flooded battery 510 is below the threshold. The sensor 512 generates the input signals indicative of the water level in the flooded battery 510 and communicates with the controller. The controller determines the water level based on the input signals and compares with the threshold preset in the controller. When the water level in the flooded battery 510 is below the threshold, the controller communicates with the three-way valve 502 to open the second outlet port 508 to allow flow of the excess water to the flooded battery 510 while the first outlet port 506 to the cooling coil 114 is closed. Similarly, the sensor 512 helps to close the three-way valve 502 towards the flooded battery 510 and open the three-way valve 502 towards the cooling coil 114 when the water level in the flooded battery 510 reaches or is above the threshold. Particularly, the controller communicates with the three-way valve 502 to open the first outlet port 506 to direct the excess water to the cooling coil 114 while the second outlet port 508 is closed.

In the present disclosure, the water condensate collected in the storage tank 108 from the AC 102 is, firstly, pumped to the wiper tank 110 for cleaning the windshield of the vehicle. When the water condensate is pumped beyond the certain level in the wiper tank 110, the excess water is allowed to flow to the flooded battery 510 through the slanted pipe 210 and the three-way valve 502 by the gravity. When the sensor 512 determines that the level of the water in the flooded battery 510 reaches or is above the threshold, the three-way valve 502 may be actuated to open the first outlet port 506 to allow flow of the water condensate to the cooling coil 114 while closing the second outlet port 508. As such, the collected water condensate in the storage tank 108 is redistributed to the auxiliary systems such as the wiper tank 110, the flooded battery 510, and the radiator 104 of the vehicle in the order of wiper tank—flooded battery—radiator. The sensor 512 disposed on the flooded battery 510 helps to control actuation of the three-way valve 502 attached to the lower end 210L of the slanted pipe 210. The second outlet port 508 of the three-way valve 502 is configured to be in an open condition to allow flow of the excess water to the flooded battery 510 while the first outlet port 506 is in closed condition, in a normal position of the three-way valve 502. When the sensor 512 detects that the water level in the flooded battery 510 reaches or is above the threshold, the second outlet port 508 of the three-way valve 502 moves to a closed condition while the first outlet port 506 is in an open condition to allow flow of the excess water to the radiator 104.

According to the present disclosure, the excess water from the wiper tank 110 flows to the flooded battery 510 or the radiator 104 by the gravitational force, thus the system 500 does not require a pump/motor, which makes the system 100 or 500 cost effective and simple to implement in the available space of the vehicle. Further, the wiper tank 110, the flooded battery 510 and the radiator 104 of the system 100, 500 are connected in series such that a series flow of the water condensate is achieved in the order of wiper tank—flooded battery—radiator to make the system 100 or 500 more efficient. The excess water can also be used to improve operational efficiency of the AC 102 by spraying the water on condenser coils.

In a preferred embodiment of the invention, the system 100 or 500 includes a Venturi valve that is installed in a combustion engine-containing vehicle. A first end of the Venturi valve is disposed within an air intake system of the engine, for example within an airway supplying a fuel injection or aspirated (carburetor-based) fuel control system. The Venturi valve is mechanically connected to and controls flow through the slanted pipe 210 that is in fluid communication with the wiper tank 110 and an external surface of the cooling coil 114 of the radiator 104 (or an interior of the cooling coil 114) or a secondary cooling coil of the AC 102. In a resting position (e.g., while the vehicle is not in motion with the engine idling), the Venturi valve is in an open position permitting flow from the wiper tank 110 for contact with the secondary cooling coil of the AC 102 or for addition to the cooling coil 114 of the radiator 104 through the slanted pipe 210. When the vehicle is moving at a high rate of speed and/or when the engine is operating under a substantial air demand condition (e.g., a racing engine), the Venturi valve moves to a closed position thereby blocking water condensate flow from the wiper tank 110 through the slanted pipe 210 and stopping flow of water condensate into the cooling coil 114 of the radiator 104 and/or stopping contact of water condensate with the secondary cooling coil. In this configuration, the system 100 or 500 permits utilization of condensate during periods when engine heat stress is high; for example, at times when the vehicle is moving at slow speeds in heavy traffic and under hot environmental conditions. The additional cooling afforded by the evaporation of water passing through the slanted pipe 210 onto the primary or secondary cooling coil reduces energy demand on the engine of the vehicle. At higher speeds when substantial cooling air passes around the vehicle and through an engine compartment of the vehicle to cool the engine and ancillary equipment such as the primary and secondary cooling coils and the radiator 104, the water condensate remains in the storage tank 108 and/or the wiper tank 110 for use during periods of slower speed travel for example during in-town peak traffic periods.

In another embodiment of the invention, the lower end 210L of the slanted pipe 210 is fitted with a fluid-carrying wick which is in direct and fluid contact with an external surface of the cooling coil 114 of the radiator 104 (or an interior of the cooling coil 114), and/or the surface of the secondary cooling coil of the AC 102 (or an interior of the secondary cooling coil). In some embodiments, the wick may follow the course of the cooling coil 114 (for example be disposed in a parallel travel and in direct continuous contact with the cooling coil 114) and/or may be at least partially spirally wound around the cooling coil 114. Preferably the wick is a fibrous material such as hydrophilized fiberglass to permit the transfer of water condensate lengthwise from the lower end 210L of the slanted pipe 210 along the length of travel of the wick coincident with the cooling coil 114. Preferably the wick is encased in a protective sheath that covers a major portion of the wick that is not in direct contact with the cooling coil 114. Preferably the sheath is perforated to permit evaporation and escape of water vapor to take better advantage of evaporative cooling of the water condensate as the water condensate passes through the wick along the course of the cooling coil 114. The wick is preferably made of linearly oriented fiberglass fibers preferably without internal braiding. Preferable hydrophilic agents include gel-like materials such as polyacrylic acid, polyacrylamide and/or polyvinyl alcohol-based compositions. In another embodiment a hydrophilic polymer such as a polyacrylamide or a polyacrylic acid (e.g., a hydrophilic carboxyl group-containing polymer) is used to uniformly coat the fiberglass fibers along the entire length to promote water condensate travel from the lower end 210L of the slanted slope 210 for contact with the cooling coil 114.

Numerous modifications and variations of the present disclosure are possible in light of the above teachings. It is therefore to be understood that within the scope of the appended claims, the invention may be practiced otherwise than as specifically described herein.

The invention claimed is:

1. A system for water collection and redistribution in a vehicle, the system comprising:
    a storage tank configured to receive water condensate from an air conditioner of the vehicle and store the water condensate;
    a wiper tank positioned above the storage tank and configured to receive the water condensate from the storage tank;
    a cooling coil positioned adjacent to a radiator of the vehicle; and
    a slanted pipe having an upper end in fluid communication with the wiper tank and a lower end in fluid communication with the cooling coil,
    wherein the wiper tank is configured to, when the water condensate reaches a certain level in the wiper tank, discharge excess water by gravity to the cooling coil via the slanted pipe to cool the radiator.

2. The system of claim 1, further comprising a discharge line that connects an upper area of the wiper tank to the upper end of the slanted pipe.

3. The system of claim 2, wherein the excess water is automatically discharged by gravity from the wiper tank to the slanted pipe via the discharge line when the water condensate reaches the upper area of the wiper tank.

4. The system of claim 3, wherein there is no pump for moving the excess water between the wiper tank and the cooling coil.

5. The system of claim 3, wherein there is no sensor for determining when the excess water is discharged from the wiper tank.

6. The system of claim 2, wherein the cooling coil is positioned below the lower end of the slanted pipe and below the upper area of the wiper tank.

7. The system of claim 2, wherein the discharge line is connected to a top surface of the wiper tank so that the wiper tank is configured to, when the wiper tank is full, discharge the excess water to the slanted pipe.

8. The system of claim 1, further comprising a three-way valve coupled with the slanted pipe.

9. The system of claim 8, wherein the three-way valve is configured to regulate water flow from the slanted pipe to enter either the cooling coil or a flooded battery of the vehicle.

10. The system of claim 9, further comprising a sensor that is configured to:
    when a water level in the flooded battery is below a threshold, close the three-way valve toward the cooling coil and open the three-way valve toward the flooded battery, and
    when the water level in the flooded battery reaches or is above the threshold, close the three-way valve toward the flooded battery and open the three-way valve toward the cooling coil.

11. The system of claim 9, wherein the three-way valve is positioned above the flooded battery.

12. The system of claim 1, further comprising a pump that includes a pump suction line and is configured to transfer the water condensate from the storage tank to the wiper tank via the pump suction line.

13. The system of claim 1, further comprising:
    a pipe or nozzle configured to transfer the water condensate from a drain of the air conditioner to the storage tank.

14. The system of claim 1, wherein the wiper tank is configured to, when the wiper tank is full, discharge excess water to a condenser of the air conditioner.

15. The system of claim 1, wherein the slanted pipe has an angle of 10-50° relative to a ground.

16. A method of water collection and redistribution in a vehicle, the method comprising:
    collecting water condensate from an air conditioner of the vehicle in a storage tank;
    transferring the water condensate from the storage tank to a wiper tank of the vehicle positioned above the storage tank; and
    when the water condensate reaches a certain level in the wiper tank, discharging excess water by gravity from the wiper tank to a cooling coil of a radiator of the vehicle via a slanted pipe that has an upper end in fluid communication with the wiper tank and a lower end in fluid communication with the cooling coil.

17. The method of claim 16, wherein the excess water is automatically discharged from the wiper tank by gravity with no sensor, when the water condensate reaches the certain level in the wiper tank.

18. The method of claim 16, wherein the excess water is automatically discharged from the wiper tank by gravity with no pump, when the water condensate reaches the certain level in the wiper tank.

19. The method of claim 16, further comprising:
when a water level in a flooded battery of the vehicle is below a threshold, closing a three-way valve toward the cooling coil and opening the three-way valve toward the flooded battery, wherein the three-way valve is coupled with the slanted slope, and
when the water level in the flooded battery reaches or is above the threshold, closing the three-way valve toward the flooded battery and opening the three-way valve toward the cooling coil.

20. The method of claim 16, further comprising transferring the water condensate from the storage tank to the wiper tank via a pump.

* * * * *